United States Patent Office 3,009,967
Patented Nov. 21, 1961

3,009,967
CHLORINATION OF ACETYLENES
Roger F. Monroe, Midland, Mich., assignor to The Dow Chemical Company, Midland, Mich., a corporation of Delaware
No Drawing. Filed Oct. 2, 1958, Ser. No. 764,738
3 Claims. (Cl. 260—654)

The present invention relates to the production of unsaturated aliphatic chlorides and is more particularly concerned with a new and useful process for the production of chlorinated alkynes and chlorinated olefins.

It has now been found that alkylacetylenes can be chlorinated directly to obtain desirable acetylenic chlorides and ethylenic chlorides, provided the reaction is carried out in accordance with the method hereinafter described. While little is known of the mechanism by which the reaction takes place, the following general equation exemplifies the observable results. Thus, (I) 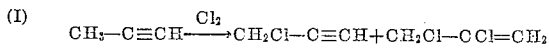

While the reactant has been exemplified as an alkyl acetylene it is to be understood that commercial alkyl acetylenes contain up to 30 or more percent of the allene tautomers. The reaction proceeds readily when the acetylenic compound is employed in molar excess and preferably in at least a 3-molar excess. Although the reaction has been described in terms of alkyl acetylene as being the reactant it is to be understood that substantially equivalent results can be obtained when the tautomeric allene compound is used. Therefore, the terms acetylene and acetylenic compound are intended hereinafter to refer to and be inclusive of organic compounds having acetylenic electronic configurations as well as those having allenic electronic configurations. The chlorination of the acetylenic compound to the 2,3-dichloroalkenes and the 3-chloroalkynes takes place smoothly at temperatures between about 100° and about 500° C. Below about 100° C. the reaction produces more highly chlorinated products, the major constituents of which have three or four chlorine atoms per molecule. While it is not presently desirable, temperatures above about 500° C. may be employed if the space velocity is of such magnitude that the flame which develops does not flash back. One method employed is to pressurize the reactor with nitrogen or other inert gas. The process is conveniently operated with present day process equipment at temperatures preferably between about 250° C. and about 400° C. and at atmospheric or slightly above atmospheric pressure. It is to be understood that subatmospheric or superatmospheric pressure can be employed.

In carrying out the process, an acetylenic compound and chlorine are vaporized, and preferably preheated to about 100° C., and, introduced into a reaction zone maintained between above about 100° and 500° C., and preferably between about 250° and 400° C. The reaction mixture is withdrawn from the reaction zone and the chlorinated products are condensed and separated from the unreacted reactants. The product is usually a mixture containing about 20–50 percent of 2,3-dichloro-1-alkene, the remainder being mostly 3-chloro-1-alkyne.

Alternatively, the reaction can be carried out by introducing and bubbling the reactants into a molten salt bath or by the flame method, i.e., burner. In the latter method, higher temperatures can be maintained, viz., above 500° C. and the reactants pressurized with an inert gas to prevent flash-back.

The reaction zone is usually a column packed with an inert material such as glass rings, beads or other shapes, poreclain shapes, aluminum oxide shapes, iron oxide-silica aluminate (ground fire brick) shapes and the like.

It is to be understood that substantially any alkyne can be employed, in the method of the present invention, which has the general formula

wherein R represents a lower alkyl radical having from 1 to 4 carbon atoms, inclusive. Thus one can employ methylacetylene (propyne-1); ethylacetylene (butyne-1); propylacetylene (pentyne-1); butylacetylene hexyne-1); isobutylacetylene (4-methylpentyne-1); and the like, and allene, methylallene, and the like.

The following examples illustrate the present invention, but are not to be construed as limiting.

*Example 1*

Chlorine gas and methylacetylene vapors were preheated to about 100° C. and simultaneously introduced in a mole ratio of about 1 to 3, respectively, into a tubular reactor 30 inches long and 1 inch in diameter and packed with ¼ inch glass rings in random distribution. The reaction temperature rose to 400° C. and was not permitted to rise above 400° C. The rate of introduction of chlorine was about 1.0 mole per minute. The reaction mixture was led from the reactor to a condenser and then to a gas separator. The gases were led to a Dry-Ice trap where methylacetylene was collected and then to a water scrubber to remove the HCl of reaction. The desired products were recovered as liquids from the separator and analyzed. The product analyzed 25 percent 3-chloro-1-propyne and 25 percent 2,3-dichloro-1-propene; the remainder was higher chlorinated propanes.

*Example 2*

In the manner of the foregoing example, employing ethylacetylene in place of methylacetylene, there was obtained 3-chloro-1-butyne and 2,3-dichloro-1-butene. Other lower alkylacetylenes behave similarly.

I claim:

1. A process which comprises separately preheating to about 100° C. and then reacting by contacting in the absence of a catalyst an alkylacetylene having from 1 to 4 carbon atoms in the alkyl portion, which can contain up to 30 percent by weight of the acetylene in the form of its allenic tautomer and chlorine in a reaction zone maintained at a temperature between about 250° and about 500° C. wherein the ratio of reactants is such that the acetylene compound is in molar excess of the chlorine and withdrawing from said reaction zone at least one of the products 2,3-dichloro-1-alkene and 3-chloro-1-alkyne.

2. The process of claim 1 wherein the molar ratio of acetylenic compound to chlorine is at least 3 to 1, respectively.

3. A process which comprises separately preheating to about 100° C. an alkylacetylene having from 1 to 4 carbon atoms in the alkyl portion, which alkyl acetylene can contain up to 30% by weight of its allenic tautomer, and chlorine, introducing the so heated reactants in a reaction zone to react by contacting in the absence of a catalyst, said reaction zone being maintained at a temperature from between about 100° and 500°, said reactants being contacted in a ratio such that the acetylenic compound is in a molar excess of the chlorine and withdrawing from said reaction zone at least one of the products 2,3-dichloro-1-alkene and 3-chloro-1-alkyne.

References Cited in the file of this patent
UNITED STATES PATENTS 2,016,572 Baumann et al. _____ Oct. 8, 1935
2,643,272 Lacomble et al. _____ June 23, 1953